May 9, 1961
A. B. SPERRY
2,983,867
ELECTRICAL SPEEDOMETER
Filed Feb. 27, 1956
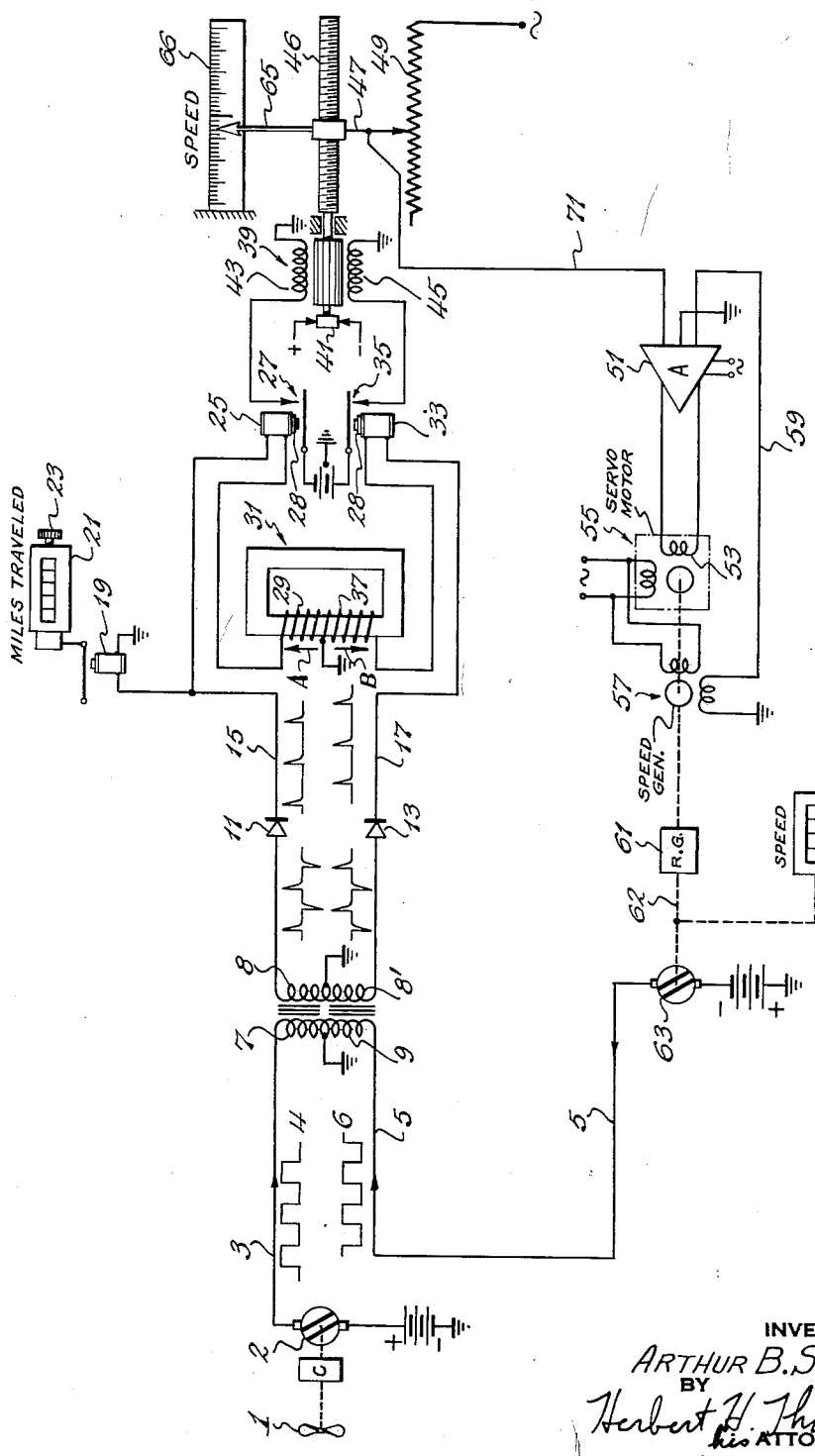
INVENTOR
ARTHUR B. SPERRY
BY
Herbert H. Thompson
his ATTORNEY.

United States Patent Office 2,983,867
Patented May 9, 1961

2,983,867
ELECTRICAL SPEEDOMETER

Arthur B. Sperry, Stewart Manor, N.Y., assignor to Sperry Rand Corporation, a corporation of Delaware Filed Feb. 27, 1956, Ser. No. 568,019

8 Claims. (Cl. 324—70)

This invention relates to a measuring instrument such as a speedometer and log for indicating the speed of and distance traveled by ships and aircraft. More specifically, my invention relates to improvements in the submerged ship's log now widely used for giving the speed and distance traveled by ships characterized by an impeller which projects through the ship's hull and is rotated as the ship passes through the water at a speed proportional to the ship's speed. Such logs have reached a high degree of perfection but involve many moving parts and continuously rotating elements subject to wear and requiring accurate machining.

In accordance with my invention, I have greatly rdeuced the number of moving parts in the mechanism of such logs which require accurate machining and fitting by providing an electrical computing means for speed, part of which only moves when there is a change in the ship's speed, and which may use electrical components of standard construction. As part of my improved mechanism, I provide an improved and novel servo loop employing a novel saturable reactor controlled relay of the flip-flop type which is believed to have many other applications than to ships' speedometers.

Referring to the drawing illustrating one form the invention may assume, the single figure shows a simplified wiring diagram of the invention. An impeller 1 driven by the ship's passage through the water usually drives some type of electrical impulse producing commutator 2 which transmits impulses through lead 3 at a repetition rate proportional to the speed of the impeller. By means hereinafter described, there is also supplied to lead 5 of this system a second series of impulses which are maintained by means, to be described, of like frequency and preferably (but not necessarily) of opposite sign but staggered with reference to the primary impulses in lead 3. The character and normal phasing of the two trains of pulses are represented by the square wave lines 4 and 6 adjacent leads 3 and 5 respectively. The first train of impulses 4 is shown as conducted through the primary of transformer 7 to ground and the second through the primary of transformer 9 to ground. The output from the secondary of each transformer is fed through rectifiers 11, 13 so that the D.C. pulses in the two trains are staggered or 180° apart in time phase. The pulses in lead 15 may be used to actuate a converter solenoid 19 to operate a counter or cyclometer 21 for indicating the distance traveled in nautical miles. A reset device 23 is shown on the counter so that the counter may be reset at the beginning of each voyage.

For obtaining the speed, lead 15 is also shown as connected to the coil 25 of relay 27, thence to ground through a coil 29 on a saturable reactor 31 of the type shown in the patent to William F. Schmitt, No. 2,713,674, dated July 19, 1955, for Flip-Flop Circuit Using a Single Core. Likewise lead 17 is connected through the coil 33 of relay 35 and thence to the other winding 37 on the saturable reactor 31. The core of said reactor is of material giving it substantial magnetic retentivity so that it preferably, although not necessarily, has a substantially rectangular hysteresis loop and sufficient current is used to saturate the core. Among other core materials of this type may be mentioned Orthonik and 4-79 Moly-Permalloy, as described in the aforesaid Schmitt patent.

Considering now the action of the saturable reactor in the system, when it receives repetitive unidirectional spaced pulses through winding 29 there will be produced repetitive and saturating magnetic flux fields in the same direction, but as it receives the staggered pulses through winding 37 there will be produced alternate magnetic flux fields in the opposite direction due to the fact that the windings 29 and 37 are wound oppositely. As these alternate staggered pulses are received, therefore, high counteractive motive forces are generated in both windings 29 and 37 because of the work required to reverse the magnetism in the core, so that little, if any, current is passed to either relay 25 or 33.

If, however, the pulses from the two sources change their phase relation because commutator 2 is running faster than the commutator 63 of a second electrical pulse producing means, a second pulse will be received through coil 29 (for example) producing a second positive flux in core 31 before a pulse is received through coil 37 to produce a negative flux. Therefore, there will be little counter electromotive force to oppose the passage of current through coil 29 since the core is already saturated in that direction. Therefore, current will pass to the coil 25 and actuate relay 27. Similarly, if commutator 63 is running the faster two pulses in sequence will be received through coil 37 before one intervenes through coil 27, wherefrom the relay 35 will be actuated.

Relays 27 and 35 are preferably each fitted with a slugged or holding band 28 to delay the drop out after the switch is once closed so that a contact is made of constant length after each second successive pulse is received through reactor winding 29 or 37.

Connected to the output of the relays is a D.C. motor 39 shown as of the field controlled type with the supply source connected across the armature 41 and with separate field windings 43, 45, one connected to the contacts on relay 27 and the other to the contacts on relay 35. Therefore, when one field winding is energized by a pulse from its relay, the motor will move a few turns in the appropriate direction of rotation upon the receipt of such pulse.

The motor is shown as rotating a lead screw 46 on which is threaded a slider 47 of a center-tapped potentiometer 49 shown as supplied with alternating current. The output of the potentiometer is fed into amplifier 51 which is shown as controlling the excitation of the variable field winding 53 of the two-phase alternating current motor 55. The other field is supplied from an A.C. source. The motor will hence rotate unidirectionally at a speed proportional to the setting of the potentiometer with respect to a motor shaft output measure indicative of zero craft speed and is shown as driving an A.C. tachometer or speed generator 57 having a feedback connection 59 to the amplifier 51 so that the motor speed is maintained exactly proportional to the potentiometer setting. Reference is made to U.S. Letters Patent No. 2,115,086, dated April 26, 1938, to A. S. Riggs for a description of the diagrammatically shown speed generator, servomotor and amplifier components of the servo loop of the improved instrument. The motor also drives through suitable gearing 61, the rotatable element or commutator 63 of the second electrical pulse means which may be similar to the transmitter 2 on the impeller, the commutator 63 supplying the pulses to the lead 5 above referred to.

As explained above, the primary pulses in lead 3 are preferably of equal and opposite effect on reactor 31 to the pulses supplied from the transmitter or commutator 63 above described. Thus commutator 63 is maintained at the same speed as commutator 2 by means of the servo loop described. As long as the speeds remain equal, the motor 39 and potentiometer slider 47 remain at rest on resistor 49, but in case the commutator 63 falls behind or gets ahead of the commutator 2, the motor 39 is adjusted to reposition the slider and change the speed of commutator 63 accordingly. Since the position of the slider 47 is indicative of the ship's speed, a speedometer pointer 65 readable on scale 66 may be connected to the same to show the ship's speed or transmitters may be connected to the same to transmit the speed to a remote speedometer as understood in the art. A speedometer may also be connected to shaft 62 of commutator 63.

From the foregoing, the operation of my improved instrument is dependent on a difference in the repetition rates of the respective pulse inputs to the saturable reactor which functions in the flip-flop circuit as a means for comparing the respective pulse rates providing an output. The coils 29, 37 in respective branches of the circuit facilitate reversible saturation of the reactor core when the respective pulse inputs thereto occur at different rates. The greater the difference in speed between the commutator 2 actuated from impeller 1 and commutator 63 operated from the servo loop the more frequent will be the recurrence of successive pulses in one of the reactor coils to determine the sense of saturation of the core of the saturable reactor 31. Therefore, the contacts on relay 27 will be held closed when the ship is accelerating. Also, the motor 39 will displace the potentiometer wiper 47 until the speed of the commutator 63 equals that of commutator 2. The reverse, of course, is true as the ship decelerates, the relay 33 then closing the circuit energizing motor 39 to effect its operation in the opposite direction. The pointer 65 or output measuring element driven by the motor 39 moves with relation to the scale 66 from a zero indicating speed condition at the extreme left hand end of the scale to a maximum speed indicating condition at the extreme right hand end of the scale as viewed in the drawing. The normal operating speed of the craft may be considered to be midway between the noted speed conditions in which case the pointer 65 is equally spaced from the respective ends of the scale. The pointer 65 is moved from a zero speed scale position toward the right by motor 39 as the craft gets under way and the commutator 2 starts turning to provide an output through the reactor that closes relay 27. As the pointer 65 moves to the right, the slider 47 of the potentiometer moves correspondingly to decrease the resistance of the resistor 49 and cause the servomotor 55 to operate and drive the commutator 63 at an increasing speed. The pointer 65 accordingly continues to move to the right until the craft reaches its normal operating condition where the speed at which the commutator 2 rotates matches that of the commutator 63 and is constant. The relay 27 then opens and the motor 39 stops with the pointer 47 located at its selected position with relation to the scale 66 indicating normal operating speed of the craft. The instrument accordingly operates so that the position of the pointer 65 is dependent of the speed of rotation of the commutator 2. In reverse operation, the craft and commutator 2 slow down and closed relay 35 then controlled by the reactor and the commutator 63 effects operation of the motor 39 in the reverse direction to move the pointer 65 toward the left hand end of the scale 66. As the slider 49 moves to the left in the drawing, the speed of servomotor 55 decreases until the speed of commutator 63 again matches the speed of commutator 2 either above or at a zero speed condition of the craft. It will be seen also that my invention uses mostly relatively stationary members and does not employ the ball and disc variable speed drives of the prior art.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus it is obvious that for the proper operation of the saturable reactor that the alternate magnetizing pulses in the magnetic core be of opposite polarity or phase, and this effect may be secured by either using two trains of staggered pulses of like polarity with the two windings 29 and 37 wound oppositely on the saturable reactor 31 as shown in the drawing or by using staggered pulses of opposite polarity with the two windings 29 and 37 wound in the same direction. In the latter case the rectifiers 11 and 13 will be reversed with respect to each other, and in the former case will pass pulses of the same polarity as shown in the drawings. In the latter case also staggered pulses from the commutators 2 and 63 should be of the same polarity, which result may be secured by reversing the polarity of the battery for commutator 63 and the direction of the winding 9 on the transformer.

What is claimed is:

1. A craft velocity measuring instrument comprising first means operable in accordance with the speed of the craft for producing spaced unidirectional electrical pulses at a repetition rate depending on the speed of the craft, second means operable in accordance with the speed of a rotatable element for producing spaced unidirectional electrical pulses with a repetition rate depending on the speed of the element, means for comparing pulse rates to provide a reversible output including a saturable reactor having a magnetic core, a core winding receiving the pulses of said first means and a second core winding receiving the pulses of said second means, said windings being relatively arranged to prevent saturation of the core when the respective pulse inputs thereto occur at corresponding rates and to facilitate reversible saturation of the core when the respective pulse inputs thereto occur at different rates, reversible means providing a measure of the velocity of the craft operable in accordance with the output of said comparing means, a servo loop having a signal controller operatively connected to said measure providing means, and a servomotor responsive to the signal of said controller for driving the rotating element of said second means at a speed depending on the measure provided by said craft velocity measuring means.

2. An instrument of the character claimed in claim 1, in which said craft velocity measuring means includes a reversible motor having an output shaft, and said signal controller in said servo loop is a potentiometer having a slider positioned in accordance with the output of said shaft.

3. An instrument of the character claimed in claim 1, including a flip-flop circuit having opposed branches, each of which includes one of the windings of the saturable reactor and a relay with an armature, and said craft velocity measuring means includes a differential circuit with the armatures of the relays of the flip-flop circuit in the respective branches thereof and a motor whose direction of rotation is dependent on the energization of the relays of the flip-flop circuit.

4. A craft velocity measuring instrument comprising first means operable in accordance with the speed of the craft for producing spaced unidirectional electrical pulses at a repetition rate depending on the speed of the craft, second means operable in accordance with the speed of a rotatable element for producing spaced unidirectional electrical pulses with a repetition rate depending on the speed of the element, means for comparing pulse rates to provide a reversible output including a saturable reactor having a magnetic core, a core winding receiving the pulses of said first means and a second core winding receiving the pulses of said second means, said windings being relatively arranged to prevent saturation of the core when the respective pulse inputs thereto occur at corresponding rates and to facilitate reversible saturation of the core when the respective pulse inputs thereto occur at different rates, a reversible motor having an output whose direction of rotation is dependent on the output of said comparing means, a speed indicator having an element driven by the output of said motor, a servo loop having a signal controller with an element driven by the output of the motor, and a servomotor operable by the signal of said controller for rotating the element of said second means at a speed depending on the output of said motor.

5. A craft velocity measuring instrument comprising a reversible motor, an element driven by the motor providing an output measure of the velocity of the craft, a flip-flop circuit with a branch for controlling the clockwise rotation of the motor and a branch for controlling the counterclockwise rotation of the motor, a saturable reactor having a magnetic core and windings on the core in the respective branches of the circuit arranged to facilitate reversible saturation of the core, means providing one of the branches of the circuit with unidirectional electrical input pulses to the reactor having a repetition rate depending on the speed of the craft, and means providing the other of the branches of the circuit with unidirectional electrical input pulses to the reactor having a repetition rate depending on the output measure of the driven element.

6. An instrument of the character claimed in claim 5, in which said other branch providing means includes a servo loop with a signal controller operatively connected to the reversible motor, a servomotor responsive to the signal of said controller, and means driven by the servomotor producing electrical pulses with a repetition rate depending on the output measure of the driven element.

7. A measuring instrument comprising a reversible motor having an output shaft, an indicator having an element driven by said shaft providing the output measure of the instrument, a flip-flop circuit with a branch for controlling the clockwise rotation of the motor and a branch for controlling the counterclockwise rotation of the motor, a saturable reactor having a magnetic core and windings on the core in the respective branches of the circuit arranged to facilitate reversible saturation of the core, means providing one of the branches of the circuit with unidirectional electrical input pulses to the reactor having a repetition rate depending on the magnitude of the variable measured by the instrument, and means providing the other of the branches of the circuit with unidirectional electrical input pulses to the reactor having a repetition rate depending on the shaft output.

8. An instrument of the character claimed in claim 7, in which said other branch providing means includes a servo loop with a signal controller having an element driven by said motor shaft, and a servomotor responsive to the signal of said controller operable at a speed depending on the output measure of the instrument.

References Cited in the file of this patent

UNITED STATES PATENTS

| | | |
|---|---|---|
| 912,291 | Cuntz | Feb. 16, 1909 |
| 2,432,327 | Moore | Dec. 9, 1947 |
| 2,514,948 | Gross | July 11, 1950 |
| 2,522,139 | Shoenbaum | Sept. 12, 1950 |
| 2,575,494 | Hornfeck | Nov. 20, 1951 |
| 2,755,417 | Molyneux | July 17, 1956 |
| 2,772,396 | Buie | Nov. 27, 1956 |
| 2,775,724 | Clark | Dec. 25, 1956 |
| 2,803,759 | Kreuder | Aug. 20, 1957 |